(12) United States Patent
Dong et al.

(10) Patent No.: US 10,315,152 B2
(45) Date of Patent: Jun. 11, 2019

(54) METHOD AND SYSTEM FOR PRESSURE SWING ADSORPTION

(71) Applicant: DK Engineering Consulting LLC, Jersey City, NJ (US)

(72) Inventors: Yuedan Dong, Jersey City, NJ (US); Junming Dong, Jersey City, NJ (US); James A. Ritter, Gilbert, SC (US); Armin D. Ebner, Lexington, SC (US)

(73) Assignee: DK ENGINEERING CONSULTING LLC, Jersey City, NJ (US)

( * ) Notice: Subject to any disclaimer, the term of this patent is extended or adjusted under 35 U.S.C. 154(b) by 203 days.

(21) Appl. No.: 15/617,597

(22) Filed: Jun. 8, 2017

(65) Prior Publication Data
US 2018/0353895 A1    Dec. 13, 2018

(51) Int. Cl.
*B01D 53/047*    (2006.01)

(52) U.S. Cl.
CPC ...... *B01D 53/047* (2013.01); *B01D 2253/102* (2013.01); *B01D 2253/104* (2013.01); *B01D 2253/106* (2013.01); *B01D 2253/108* (2013.01); *B01D 2253/116* (2013.01); *B01D 2256/10* (2013.01); *B01D 2257/2064* (2013.01); *B01D 2259/402* (2013.01);
(Continued)

(58) Field of Classification Search
CPC ............ B01D 53/047; B01D 2253/102; B01D 2253/104; B01D 2253/106; B01D 2253/108; B01D 2253/116; B01D 2256/10; B01D 2257/2064; B01D 2257/206; B01D 2259/40013; B01D 2259/40028; B01D 2259/402; B01D 2259/40043; B01D 2259/40052

USPC .............. 95/96–98, 104, 105, 141, 142, 148
See application file for complete search history.

(56) References Cited

U.S. PATENT DOCUMENTS

| 4,066,423 A | 1/1978 | McGill et al. ..................... 55/48 |
| 4,305,734 A | 12/1981 | McGill ............................. 55/25 |

(Continued)

FOREIGN PATENT DOCUMENTS

| CA | 1 193 982 | 9/1985 |
| EP | 0 628 336 | 12/1994 |

(Continued)

OTHER PUBLICATIONS

Figure 1.1, source and publication date unknown.
(Continued)

*Primary Examiner* — Frank M Lawrence, Jr.
(74) *Attorney, Agent, or Firm* — Ostrolenk Faber LLP

(57) ABSTRACT

Disclosed is a method for recovering a volatile organic compound (VOC) using pressure swing adsorption carried out with two beds that includes feeding the VOC to the first bed for adsorption and, while the VOC is being adsorbed by the adsorbent material in the first bed, simultaneously extracting the VOC adsorbed by the adsorbent material in the second bed through executing a desorption step by reducing the pressure of the second bed to cause desorption of the VOC in the adsorbent material of the second bed, executing a reflux step by transferring gas to the second bed and removing the transferred gas from the second bed, and executing a repressurization step by increasing pressure of the second bed to a pressure suitable for adsorption of the VOC by the adsorbent material in the second bed.

18 Claims, 3 Drawing Sheets

(52) U.S. Cl.
CPC ............. *B01D 2259/40013* (2013.01); *B01D 2259/40028* (2013.01); *B01D 2259/40052* (2013.01)

(56) References Cited

U.S. PATENT DOCUMENTS

| | | | |
|---|---|---|---|
| 4,331,456 A | 5/1982 | Schwartz et al. | 55/26 |
| 4,338,101 A | 7/1982 | Tuttle | 55/48 |
| 4,371,380 A * | 2/1983 | Benkmann | B01D 53/047 95/100 |
| 4,421,532 A | 12/1983 | Sacchetti et al. | 55/28 |
| 4,462,811 A | 7/1984 | Dinsmore et al. | 55/18 |
| 4,528,000 A | 7/1985 | McGill et al. | 55/2 G |
| 4,670,028 A | 6/1987 | Kennedy | 55/48 |
| 4,715,868 A | 12/1987 | Kennedy | 55/48 |
| 4,842,621 A | 6/1989 | Robbins et al. | 55/26 |
| 4,857,084 A | 8/1989 | Robbins et al. | 55/58 |
| 5,125,935 A | 6/1992 | Nakaya et al. | 55/26 |
| 5,154,735 A | 10/1992 | Dinsmore et al. | 55/25 |
| 5,213,593 A | 5/1993 | White, Jr. | 55/26 |
| 5,259,853 A | 11/1993 | Brasier et al. | 95/92 |
| 5,269,833 A | 12/1993 | Nitsche | 95/93 |
| 5,294,246 A | 3/1994 | Gardner, Sr. | 95/15 |
| 5,345,771 A | 9/1994 | Dinsmore | 62/18 |
| 5,415,682 A * | 5/1995 | Zarchy | B01D 53/0476 95/101 |
| 5,426,945 A | 6/1995 | Menzenski | 62/11 |
| 5,480,475 A * | 1/1996 | Tuttle | B01D 53/04 55/356 |
| 5,515,686 A | 5/1996 | Jordan | 96/126 |
| 5,584,911 A | 12/1996 | Menzenski | 95/94 |
| 5,591,254 A | 1/1997 | Gibson | 96/113 |
| 5,671,612 A | 9/1997 | Menzenski | 62/611 |
| 5,681,369 A | 10/1997 | Osborne | 95/93 |
| 5,765,395 A | 6/1998 | Menzenski | 62/611 |
| 5,853,455 A | 12/1998 | Gibson | 95/11 |
| 5,871,568 A | 2/1999 | Gibson | 96/117 |
| 5,951,741 A | 9/1999 | Dahl et al. | 95/11 |
| 6,287,365 B1 * | 9/2001 | Markovs | B01D 53/0462 95/117 |
| 6,486,375 B1 | 11/2002 | Lenhart et al. | 585/820 |
| 7,326,278 B2 * | 2/2008 | Butters | B01D 5/0054 210/188 |
| 8,758,480 B2 | 6/2014 | Turnbull et al. | 95/8 |
| 8,979,982 B2 | 3/2015 | Jordan et al. | 95/146 |
| 9,095,811 B2 | 8/2015 | Dolensky | |
| 9,211,493 B2 | 12/2015 | Applegarth et al. | |
| 9,216,374 B2 | 12/2015 | Fujimine et al. | |
| 2006/0236863 A1 * | 10/2006 | Weist, Jr. | B01D 53/047 95/96 |
| 2015/0135950 A1 | 5/2015 | Gomez et al. | 95/92 |

FOREIGN PATENT DOCUMENTS

| | | |
|---|---|---|
| JP | 2008-12439 | 1/2008 |
| NZ | 5691159 | 11/2010 |
| WO | WO 96/04978 | 2/1996 |
| WO | WO 98/51398 | 11/1998 |

OTHER PUBLICATIONS

D. D. Do, "Adsorption Analysis: Equilibria and Kinetics," *Series on Chemical Engineering vol. 2* (1998).
N. Bessho, "Advanced Pressure Swing Adsorption System with Fiber Sorbents for Hydrogen Recovery," *Dissertation for Georgia Institute of Technology* (2010).
S. Jyoti Bhadra, "Methane-Nitrogen Separation by Pressure Swing Adsorption," *Thesis for National University of Singapore* (2007).
Y. Liu et al., "Simulation gasoline vapor recovery by pressure swing adsorption" *Separation and of Purification Technology*, 20:111-127 (2000).
Siew Wah Chai, "Experimental Simulation of Rapid Pressure Swing Adsorption for Medical Oxygen Concentrator and Numerical Simulation of the Critical Desorption-by-Purge Step," *Theses and Disserations for Lehigh University* (2011).
J.A. Ritter et al., "New Approach for Modeling Hybrid Pressure Swing Adsorption-Distillation Processes," *Industrial & Engineering Chemistry Research*, 51:9343-9355 (2012).
H. Khajuria et al., "Optimization and Control of Pressure Swing Adsorption Systems," *Centre for Process System Engineering Department of Chemical Engineering, Imperial College* (2012).
Y. Liu et al., "Solvent Vapor Recovery by Pressure Swing Adsorption. III. Comparison of Simulation with Experiment for the Butane-Activated Carbon System," *Separation Science and Technology*, 34(8):1545-1576 (1999).
S. J. Bhadra, "Purification of Ammonia by Pressure Swing Adsorption," *University of South Carolina* (2012).
S.J. Bhadra. et al., "Separation of Methane-Nitrogen Mixture by Pressure Swing Adsorption for Natural Gas Upgrading," *Industrial & Engineering Chemistry Research*, 50:14030-14045 (2011).
A. Mehrotra et al., "Simplified graphical approach for complex PSA cycle scheduling," *Adsorption*, 17:337-345 (2011).
A.L. Kohl et al., *Gas Purification*, Fifth Edition, Imperial College Press, pp. 438-442 and 634-638 (1997).
R.T. Yang, *Gas Separation by Adsorption Processes*, Imperial College Press, pp. 238-249 and 276-285 (1997).

* cited by examiner

METHOD AND SYSTEM FOR PRESSURE SWING ADSORPTION

FIELD OF INVENTION

The present invention relates to a method and system for recovery of Volatile Organic Compounds (VOCs) (especially organic halogens) using pressure swing adsorption (PSA).

BACKGROUND

VOCs are found in a wide variety of tail gas produced in chemical plants, and cause significant environmental pollution. As a consequence, environmental regulations around the world seek to strictly control and limit VOC emissions.

Often VOCs are expensive raw materials. Separating and recycling VOCs could help a chemical manufacturer save on the cost of raw materials while meeting environmental regulations.

The following are some of the available commercial technologies for capturing VOCs.

A first known method involves incineration/catalytic decomposition of VOCs, which destroys VOCs, but requires high energy consumption. Another known method requires a refrigeration/cryogenic process to extract the VOCs, which results in a low-purity recovery, and requires high energy consumption. Temperature swing adsorption is another known method, which requires a long operation cycle time, high energy consumption, and may present safety issues.

Currently known PSA processes focus mainly on the recovery of inorganic gas such as H2 and O2, or hydrocarbon mixtures such as gasoline. Due to the chemical complexity of VOCs, VOC-targeted PSA systems in the current commercial market have limited usage, and strongly depend on the pump operating conditions as, for example, disclosed in U.S. Pat. No. 4,857,084. Furthermore, the concentration of VOCs in the emission after PSA cannot satisfy most recent environmental regulations in most countries.

SUMMARY

An objective of the present invention is to reduce environmental pollution.

Another objective of the present invention is to meet the most recent environmental regulations in many countries.

A further objective of the present invention is to recover VOCs, and thereby reduce the concentration of VOCs emitted from a chemical factory. For example, Chlorotrifluoroethylene vapor can be separated and recycled from carrier gas in chemical plants that produce electronic materials.

It is believed that, depending on the market value of the recovered VOC, the recovery of reusable VOC can significantly offset the cost of installing a PSA system that carries out a process according to the present invention, in that a process according to the present invention can be performed with lower energy and operation costs.

VOCs have much more complex molecular structures than hydrocarbons and inorganic gases. Some VOCs may chemically react with adsorbents in addition to physical interaction. Also, the desorption step is generally the slowest step and determines the whole cycle time. The desorption step requires a larger pressure differential to desorb VOCs. Consequently, PSA systems devised to recover VOCs are much more complicated than PSA systems that recover inorganic gas or hydrocarbons.

Unlike the system shown in U.S. Pat. No. 4,857,084, a system according to the present invention may generate vacuum using dry screw pumps, dry claw pumps or liquid ring pumps in which the sealing material is the same or includes components that have the adsorbed VOCs. For example, a PSA system that performs a process according to the present invention to adsorb and desorb toluene can use dry screw pumps, dry claw pumps or liquid ring pumps having toluene as the sealing materials. On the other hand, heating the oil inside the type of pump proposed in U.S. Pat. No. 4,857,084 would cause thermal expansion of the pump materials, causing cavitation.

Unlike the process disclosed in U.S. Pat. No. 4,857,084, in a process according to the present invention desorption is effected with three sequential steps in one bed while the adsorption is effected in another bed simultaneously.

In a process according to the present invention, the choice of adsorbent material would depend on the VOC that is to be recovered. A suitable adsorbent material may be a zeolite, a molecular-sieve carbon, activated carbon, silica gel or activated alumina. However, a process according to the present invention does not use microporous resin beads as used in the process disclosed in U.S. Pat. No. 4,857,084 because microporous resin has little internal discrete pores resulting in poor adsorption capacity for VOCs.

It is believed that a process according to the present invention can lower the concentration of VOC in the emission, can be performed to recover different types of VOCs, and can recover higher percentages of VOCs compared to known PSA processes for the extraction of VOCs.

A process according to the present invention is easy to control, unlike the process disclosed in the U.S. Pat. No. 4,462,811, in which the PSA regeneration process needs to discontinue the secondary absorbent liquid flow for a specific time. The discontinuation of the absorbent liquid flow to the hydrocarbon recovery scrubber makes the design of the control system challenging for different VOCs. In a process according to the present invention, a simple condenser is used instead of a scrubber for VOC recovery.

A process according to the present invention consumes less energy because it does not require the provision of thermal energy to the desorption bed from an external source (i.e. heating) during the regeneration step, which could save energy compared to the processes proposed in U.S. Pat. Nos. 4,331,456, 5,125,935, 5,213,593 or Japanese Patent Application Laid-Open Publication No. 2008-12439.

A process according to the present invention would not require a refrigeration unit as, for example, required by the process disclosed in U.S. Pat. No. 5,426,945.

It is believed that the efficiency of a system devised to perform a process according to the present invention can be at least 99%, meaning that at least 99% of the VOC component of the inlet vapor is captured for recycling, which is higher than many known PSA systems for the extraction of VOCs, for example, the system shown in U.S. Pat. No. 4,842,621.

A process according to the present invention can be performed using a dry vacuum pump or a dry claw pump, thereby avoiding the need to circulate a vacuum pump seal liquid and to separate the VOC from the seal liquid as, for example, would be needed for a system proposed in U.S. Pat. No. 5,584,911. In an adsorption column, there is a pressure difference between the inlet and the outlet ("pressure drop"). Inlet vapor flows into the adsorption column from the bottom to the top. Thus, pressure loss happens in an adsorption column because of the force of gravity and the resistance by the adsorbent material. A system designed to perform a method according to the present invention may have a small pressure drop in the range 1-3 kPa.

A method according to the present invention can be carried out to recover a volatile organic compound (VOC) with a pressure swing adsorption system that includes a first bed having adsorbent material suitable for adsorption of the VOC and a second bed having adsorbent material suitable for adsorption of the VOC.

A method according to the present invention may be performed by feeding the VOC to the adsorbent material of the first bed while the adsorbent material of the first bed is in a suitable state for adsorption of the VOC and, while the VOC is being adsorbed by the adsorbent material in the first bed, simultaneously extracting the VOC adsorbed by the adsorbent material in the second bed through executing a desorption step by sequentially disconnecting the first bed from the second bed and reducing the pressure of the second bed to cause desorption of the VOC in the adsorbent material of the second bed, executing a reflux step by transferring gas from the first bed to the second bed and removing the transferred gas from the second bed, and executing a repressurization step by increasing pressure of the second bed to a pressure suitable for adsorption of the VOC by the adsorbent material in the second bed using gas from the first bed.

The pressure of the second bed may be reduced during the desorption step with a dry screw, a dry claw or a liquid ring vacuum pump having a seal that includes the VOC as a component.

A method according to the present invention may further include operating the vacuum pump to remove the transferred gas from the second bed during the reflux step.

A method according to the present invention may also include keeping the vacuum pump off during the repressurization step.

A method according to the present invention may be carried out to recover an organic halogen, such as, epichlorohydrin, chlorobenzene, dichloromethane, carbon tetrachloride or benzyl chloride, or to recover toluene, xylene, benzene, ethylene, methanol, or ethanol.

A method according to the present invention may additionally include, after the repressurization step, feeding the VOC to the adsorbent material of the second bed when the adsorbent material in the second bed is rendered suitable for adsorption of the VOC through the repressurzation step and, while the VOC is adsorbed by the adsorbent material in the second bed, simultaneously extracting the VOC adsorbed by the adsorbent material of the first bed by executing another desorption step by sequentially disconnecting the first bed from the second bed and reducing pressure of the first bed to cause desorption of the VOC in the adsorbent material of the first bed, executing another reflux step by transferring gas from the second bed to the first bed while removing the transferred gas from the first bed, and executing another repressurization step by increasing pressure of the first bed to a pressure suitable for adsorption of the VOC by the adsorbent material in the first bed using gas from the second bed.

In a method according to the present invention, a feed gas containing the VOC may be fed from a supply section to the first bed while the VOC is simultaneously extracted from the adsorbent material in the second bed, and the feed gas may be fed to the second bed, while the VOC is extracted from the adsorbent material in the first bed.

A method according to the present invention may further include operating a vacuum pump to reduce pressure of the second bed during the desorption step, and to reduce pressure of the first bed during the another desorption step.

In a method according to the present invention the feed gas may include a carrier gas and the VOC, and the carrier gas may be directed to a tank after each extracting step.

In a method according to the present invention, the pressure of the second bed may be reduced to a pressure in the range 2-20 kPa during the desorption step, and the pressure of the first bed may be reduced to a pressure in the range 2-20 kPa during the another desorption step.

In a method according to the present invention, 10-20% of the carrier gas in the first bed may be the gas transmitted to the second bed during the reflux step, and 10-20% of the carrier gas may be the gas transmitted from the second bed to the first bed during the another reflux step.

In a method according to the present invention, the pressure drop of the first bed or the pressure drop of the second bed may be in the range 1-3 kPa while the VOC is being adsorbed.

In a method according to the present invention, the adsorbent material of the first bed and the second bed may be a zeolite, a molecular-sieve carbon, activated carbon, silica gel, or activated alumina.

A method according to the present invention may include recovering the VOC extracted from the first bed or the second bed with a condenser.

A method according to the present invention may include terminating the feeding of the VOC and switching to the extracting of the VOC at no more than 80% of the maximum saturation of the adsorbent material that is adsorbing the VOC.

In a method according to the present invention, the first bed and the second bed may be selectively connectable to permit gas transfer from the first bed to the second bed, and gas transfer from the second bed to the first bed, and selectively disconnectable to prevent gas transfer from the first bed to the second bed or from the second bed to the first bed, and the reflux step may be executed by connecting the first bed to the second bed and transferring gas from the first bed to the second bed and removing the transferred gas from the second bed, and the another reflux step may be executed by connecting the second bed to the first bed and transferring gas from the second bed to the first bed and removing the transferred gas from the first bed.

In a method according to the present invention, the repressurization step may be executed by connecting the first bed to the second bed and transferring gas from the first bed to the second bed, and the another repressurization step may be executed by connecting the second bed to the first bed and transferring gas from the second bed to the first bed.

Other features and advantages of the present invention will become apparent from the following description of the invention which refers to the accompanying drawings.

DETAILED DESCRIPTION OF THE EMBODIMENTS

Figure 1:
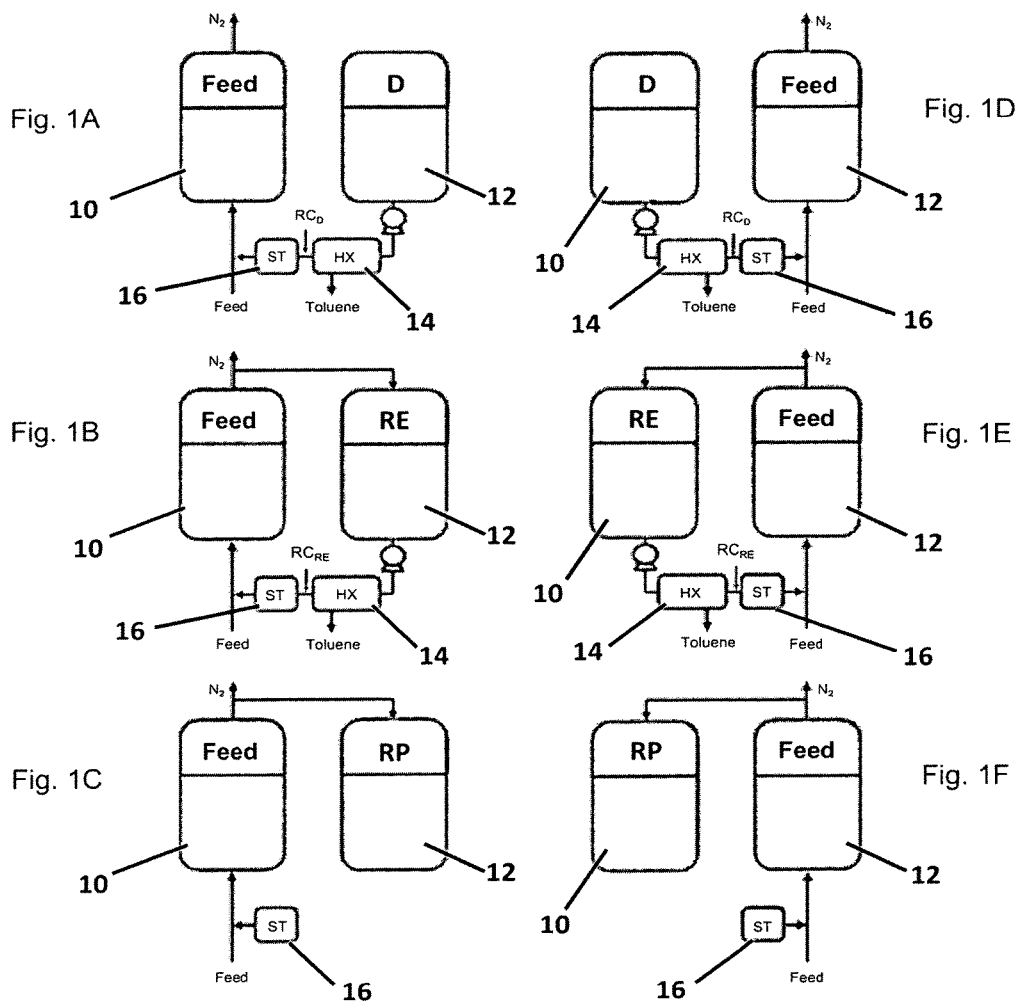
FIGS. 1A-1F show two beds of a PSA system in different stages of one cycle of a process according to the present invention.

Referring to FIGS. 1A-1F, a pressure swing adsorption system according to the present invention includes at least two beds 10, 12, which are operated according to the present invention to recover a VOC from a feed gas that includes at least one VOC species and a carrier gas, such as nitrogen. The two beds 10, 12 can be connected to each other, disconnected from one another, connected to other equipment within the system and disconnected from the other equipment within a system to execute a process according to the present invention as will be further described below.

Each bed 10, 12 includes an adsorbent material that is suitable for the adsorption of the VOC that is carried by the feed gas. The feed gas may include a carrier gas such as nitrogen or the like gas which carries the VOC. The VOCs that may be recovered with a process according to the present invention may be organic halogens and could be, for example, epichlorohydrin, chlorobenzene, benzyl chloride, toluene and the like.

In an initial state, before the start of a process according to the present invention, the adsorbent material in the first bed 10 of the two beds 10, 12 may be substantially free (i.e. may contain retained VOC from the previous cycle, which will be desorbed along with newly absorbed VOC in the next cycle) or completely free of a VOC that is to be recovered from a feed gas. A process according to the present invention begins from an initial state. Before the initial state, the beds 10, 12 go through a start-up process. The start-up process begins with clean beds 10, 12. It takes hundreds or thousands of adsorption/desorption cycles to reach a steady state. The initial state begins at the steady state. Thus, at the beginning of the start-up process both beds 10, 12 are clean, i.e. neither bed 10, 12 contains VOCs. At the beginning of the initial state and during the steady state the two beds 10, 12 alternately adsorb and desorb VOCs.

In the initial state, the adsorbent material in the second bed 12 of the two beds 10, 12 will have adsorbed the VOC that is to be recovered, the amount of which will be higher than the amount in the adsorbent material in the first bed 10 (if the adsorbent in the first bed contains any VOC).

A process according to the present invention is carried out in cycles.

In a process according to the present invention each half cycle includes adsorption of VOC from the feed gas in one bed and desorption of VOC from the adsorbent material in the other bed simultaneously. A half cycle may last for a predetermined period of time, which depends on the VOC and the adsorbent material used in the two beds.

A process according to the present invention includes four steps in each half cycle. The four steps include an adsorption step (A) of feeding feed gas into one of the two beds (see FIGS. 1A, 1B, 1C, 1D, 1E, 1F), and the sequential execution of desorption step (D) (see FIGS. 1A, 1D), a reflux step (Re) (see FIGS. 1B, 1E), and a repressurization step (RP) (see FIGS. 1C, 1F) in the other of the two beds.

Referring to FIG. 1A, in the adsorption step (A), while the two beds are in the initial state, the first bed 10 is fed and receives the feed gas. After receiving a certain amount of the feed gas, depending on the VOC, the pressure in the first bed 10 may be increased above the atmospheric pressure. However, depending on the VOC, the pressure may be at atmospheric pressure. In either case, the pressure is kept constant during the adsorption step (A). Thus, depending on the VOC, the pressure inside of the first bed 10 may be increased to an adsorption pressure (Ph). The adsorption pressure (Ph) would be at least the minimum pressure inside of the first bed 10 that would cause the adsorbent material in the first bed 10 to adsorb the VOC contained in the feed gas inside the first bed 10, which may be atmospheric pressure for some VOCs. The optimal adsorption pressure (Ph) may vary and would depend on variables known to a skilled person such as bed size, adsorption and desorption time length, rate of back purge flow, the adsorbent material, and the like factors.

While the feed gas is being supplied to the first bed 10, and the first bed 10 is operating in the adsorption mode, the pressure inside of the second bed 12, which is at the adsorption pressure (Ph), is reduced to the desorption pressure (PL). In this step, the first bed 10 and the second bed 12 are disconnected (i.e. the desorption process and the adsorption process are isolated from one another) and a vacuum pump is used to decrease the pressure in the second bed 12 until, for example, vacuum pressure. Vacuum pressure for the purposes of this application is defined as pressure falling in the range 2-20 kPa. The appropriate vacuum pressure would depend on the VOC type and VOC removal efficiency requirement. In most cases, the vacuum pressure would be in the range 2-5 kPa. The desorption pressure (P1) is the pressure at which the VOC adsorbed by the adsorbent material in the second bed 12 is desorbed at a lower pressure. The optimal desorption pressure (P1) may vary and would depend on variables known to a skilled person such as bed size, adsorption and desorption time length, rate of back purge flow, the adsorbent material, and the like factors.

Referring to FIG. 1B, while the adsorption process is occurring in the first bed 10 (i.e. the first bed 10 is an adsorption mode), and the pressure inside of the first bed 10 is at adsorption pressure (Ph), a reflux step (Re) is carried out in the second bed 12. In this step, the first bed 10 and the second bed 12 are connected to permit passing carrier gas exiting from the first bed 10 to the second bed 12, while the vacuum pump keeps working. There are VOCs in the void spaces between adsorbent particles and in the pores of the adsorbent in the second bed 12. Purging VOCs with carrier gas by applying the reflux step (Re) helps remove VOCs in both phases and increase product purity significantly. Redirecting 10-20% of carrier gas from the first bed 10 to the second bed 12 (or the second bed 12 to the first bed 10) would help remove adsorbed VOC substantially. The cycle time should be kept short to conserve the heat of adsorption (the temperature increases during adsorption and decreases during desorption). Continuous operation ensures a short cycle time. Otherwise, frequent turning on/off of the pumps may damage the pumps and may cause step delay.

Referring to FIG. 1C, while the adsorption process is still occurring in the first bed 10 (i.e. while the first bed is in adsorption mode), and after the reflux step (Re), the repressurization step (RP) is carried out in the second bed 12. To perform this step, the vacuum pump is shut down and a large amount of carrier gas exiting the first bed 10 is directed from the first bed 10 to the second bed 12. The vacuum pump is shut down to increase the pressure to Ph in bed 12 so the second bed 12 can start to adsorb VOC during the next cycle. Shutting the pump down allows the pressure to increase faster thereby shortening the cycle time. Also, VOCs have been substantially desorbed from the second bed 12 during desorption and reflux steps. The total adsorption time is the sum of desorption time, reflux time and repressurization time. Every adsorbent has a VOC adsorption saturation value (not the same for every type of VOC). Normally, the saturation value would be set at 80% of the maximum saturation of the adsorbent at the end of the adsorption step (A). In other words, the VOC saturation concentration wavefront only reaches to about 80% of the way into the bed during the feed step, leaving about 20% of the bed unsaturated. The end of the second step (desorption step) is when the bed pressure reaches P1. The third step ends when it is determined that either the adsorption process is complete or the desorption process is complete, which could be predetermined and computer controlled. The end of the fourth step (repressurization) is also determined by the pressure, Ph. All of these parameters are programmed in the PLC automatic control system.

After the repressurization step, the four steps in the first half cycle are over. At this point, the VOC from the feed gas is adsorbed by the adsorbent material in the first bed 10, while the VOC has been desorbed from the adsorbent material in the second bed 12 and the adsorbent material in the second bed 12 is substantially free of VOC. In this state, the two beds are in an initial state for the next half cycle. In the next half cycle, the process carried out during the first half cycle or the present invention is again carried out as described above. That is, in the same manner as described above, the second bed 12 is fed and receives feed gas to adsorb the VOC in an adsorption step (A) (see FIGS. 1D, 1E, 1F), while the VOC from the first bed 10 is desorbed through a desorption step (D) (see FIG. 1D), a reflux step (Re) (see FIG. 1E), and a repressurization step (RP) (see FIG. 1F), which are carried out sequentially.

Thus, according to the present invention, the process proceeds to supply feed gas continuously into a VOC adsorption system because in any give half cycle, one of the two beds 10, 12 is receiving feed gas in an adsorption step (A), while in the other of the two beds 10, 12 a desorption step (D), a reflux step (Re), and a repressurization step (RP) are sequentially performed.

The temperature increase during adsorption of the VOC from the feed gas is about 10° C., but it could also be higher or lower depending on the VOC.

A heat exchanger 14 may be used to remove condensed VOC (e.g. toluene) at 1 atm and temperature $T_{HX}$. A surge tank 16 may be provided to maintain the VOC (e.g. toluene) rich product well mixed and at a constant flow while being mixed with the feed stream. In the figures, the $RC_D$ and $RC_{RE}$ are respectively the average recycle flows from the desorption (D) and the reflux(Re) steps.

Figure 2:
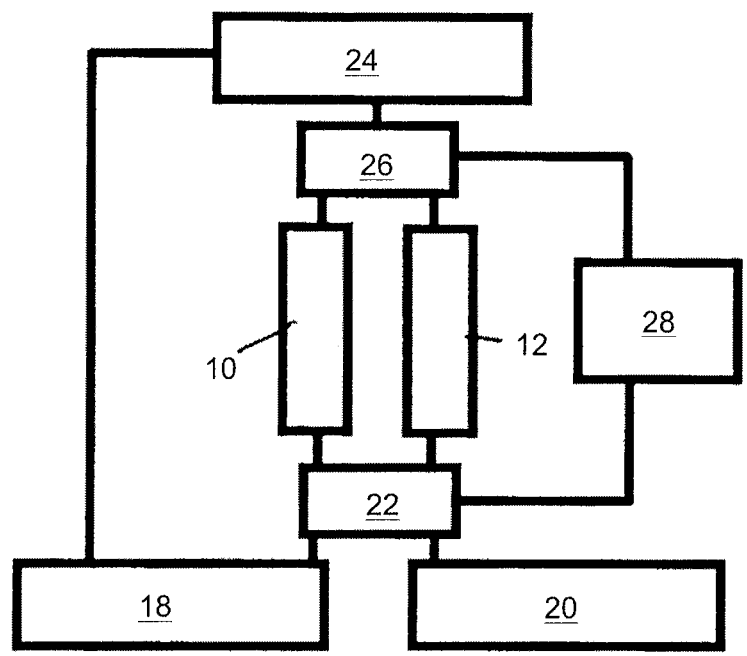
FIG. 2 shows a block diagram of a system for carrying out a process according to the present invention.

Referring to FIG. 2, a system according to the preferred embodiment of the present invention includes a supply section 18, which can selectively supply feed gas (i.e. is connected to supply feed gas to one of the two beds 10, 12 in each half cycle) to each of the two beds 10, 12, and a recovery section 20 which selectively recovers (i.e. is connected to recover VOC from one of the two beds 10, 12 in each half cycle) the VOC from each one of the two beds 10, 12.

The supply section 18 is connected to one of the beds 10, 12 in each half cycle via at least one valve in a feed gas transmission section 22, and connected to the other one of the two beds 10, 12 via at least another valve in the feed gas transmission section 22 in the other half cycle. The feed gas that is supplied to each one of the two beds 10, 12 is subjected to adsorption, which extracts the VOC from the feed gas. The feed gas that is subjected to adsorption is then directed to a recycle section 24, which recycles the carrier gas for use in the feed gas. If the carrier gas is air it may be vented directly. If the carrier gas is $N_2$, $O_2$ or a more expensive gas, the clean carrier gas may be directed to the LP (light product) tank for recycling. Each bed 10, 12 is also selectively connected (i.e. connected to one of the two beds 10, 12 in each half cycle) to the recycle section 24 via at least one valve in the clean gas transmission section 26 as it receives feed gas during the adsorption mode.

The recovery section 20 is connected to one of the two beds 10, 12 in each half cycle via at least one valve during the three-step desorption mode to permit recovery of the VOC from each bed.

The valves in a system for carrying out a process according to the present invention are electronically controllable. To carry out a process according the present invention, a programmed controller 28 (e.g. a PC or the like computer having a memory section and a data processor (CPU)) executes a program to open and close the appropriate valves in order to carry out a process according to the present invention.

Figure 3:
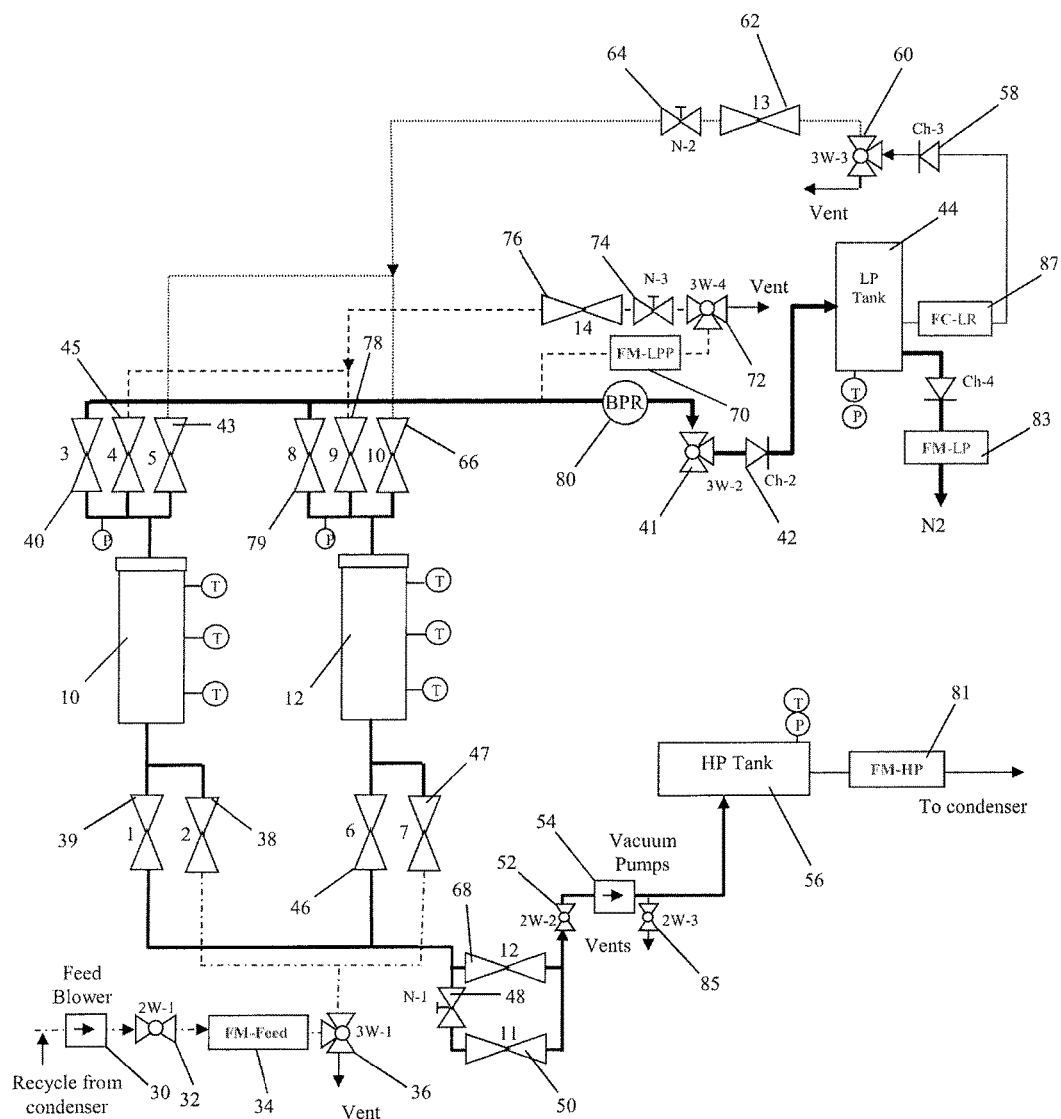
FIG. 3 shows an embodiment of a system for carrying out a process according to the present invention.

Referring to FIG. 3, the feed section 18 may include a feed blower, a pressure/temperature transmitter, valves, and a condenser if inlet vapor is too hot. The recovery section 20 may include a vacuum pump, a condenser, a heavy product (VOC) tank, a flow meter, a pressure/temperature transmitter, and valves. The recycle section 24 may include a flow meter, a light product tank if carrier gas is not air, a pressure/temperature transmitter, and valves.

In the first half cycle, while the first bed 10 undergoes adsorption, feed gas containing VOCs and carrier gas passes through feed blower 30, 2-way valve 32, flow meter 34, 3-way valve 36 and controllable valve 38 and is subjected to adsorption. Clean gas (carrier gas and very small amount of VOCs) leaves the first bed through valve 40, a back pressure regulator (BPR) 80 or pressure controller, 3-way valve (3w-2) 41, check valve (Ch-2) 42 to storage tank (LP Tank) 44.

Meanwhile, in the first half cycle, the second bed 12 is undergoing desorption. Desorbed VOCs flow through controllable valve 46, needle valve (N-1) 48, valve 50, 2 way valve(2w-2) 52 and vacuum pump 54 into VOCs storage tank (HP Tank) 56 during the first step in desorption.

During the second step in desorption, partial carrier gas from LP tank 44 is purged to the second bed 12 through check valve(ch-3) 58, 3 way valve(3w-3) 60, valve 62, needle valve 2 (N-2) 64 and valve 66, and desorbed VOCs leave the second bed 12 through valve 46 and valve 68 to vacuum pump 54.

During the third step in desorption, vacuum pump 54 stops working and clean gas flows through flow meter (FM-LPP) 70, 3-way valve(3w-4) 72, needle valve(N-3) 74, valve 76 and valve 78 into the second bed 12.

Table 1 shows the valves that are open during the first half cycle. Valves that are not indicated as open are closed in this half cycle.

During the second half cycle the first bed 10 and the second bed 12 switch roles as previously described. Table 2 shows the valves that are open during the second half cycle. Valves that are not indicated as open are closed during the second half cycle. The system may also include a flow meter for heavy product (FM-HP) 81, a flow meter for light product (FM-LP) 83, a flow meter for the reflux step (FC-LR) 87, and a third two-way valve (2W-3) 85. FM-HP 81 measures the heavy product (targeted VOC) flow rate, FM-LP 83 measures the light product flow rate, FC-LR 87 is a flow controller to set and control the flow rate of reflux carrier gas, 2W-3 85 vents the valve connected to the vacuum pump and may not be needed if the vacuum pump already has a built-in venting function.

TABLE 1

| Left Column | Right Column | Open Valves (V1~V14) |
|---|---|---|
| Adsorption | Desorption Step 1 | 38, 40, 46, 50 |
| | Desorption Step 2 | 38, 40, 46, 66, 68, 62 |
| | Desorption Step 3 | 38, 40, 78, 76 |

TABLE 2

| Left Column | Right Column | Open Valves (V1~V14) |
|---|---|---|
| Desorption Step 1 | Adsorption | 39, 47, 79, 50 |
| Desorption Step 2 | | 39, 43, 47, 79, 68, 62 |
| Desorption Step 3 | | 45, 47, 79, 76 |

A pressure swing adsorption system to carry out a process according to the present invention can include beds (adsorption & desorption columns) that are 2.20 meters long and 1.1 meters in diameter. Preferably, the VOC in the feed gas is toluene vapor in nitrogen gas as carrier gas with 1460 ppm concentration at room temperature. The inlet flow rate can be 9167 SLPM and recycle flow rate can be 2440 SLPM. Clean gas leaving the bed in the adsorption mode can contain less than 2 ppm toluene, removing and recycling 99.9% toluene. The condenser temperature can be maintained at 5° C.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for recovering a volatile organic compound (VOC) with a pressure swing adsorption system that includes a first bed having adsorbent material suitable for adsorption of the VOC and a second bed having adsorbent material suitable for adsorption of the VOC, the method comprising:

feeding the VOC to the adsorbent material of the first bed while the adsorbent material of the first bed is in a suitable state for adsorption of the VOC and, while the VOC is being adsorbed by the adsorbent material in the first bed, simultaneously extracting the VOC adsorbed by adsorbent material in the second bed through executing a desorption step by sequentially disconnecting the first bed from the second bed and reducing the pressure of the second bed to cause desorption of the VOC in the adsorbent material of the second bed, executing a reflux step by transferring gas from the first bed to the second bed and removing the transferred gas from the second bed, and executing a repressurization step by increasing pressure of the second bed to a pressure suitable for adsorption of the VOC by the adsorbent material in the second bed using gas from the first bed.

2. The method of claim 1, wherein the pressure of the second bed is reduced during the desorption step with a dry screw, a dry claw or a liquid ring vacuum pump having a seal that includes the VOC as a component.

3. The method of claim 2, further comprising operating the vacuum pump to remove the transferred gas from the second bed during the reflux step.

4. The method of claim 3, further comprising keeping the vacuum pump off during the repressurization step.

5. The method of claim 4, wherein the VOC is an organic halogen.

6. The method of claim 4, wherein the VOC is toluene, xylene, benzene, ethylene, methanol, ethanol or an organic halogen selected from a group consisting of epichlorohydrin, chlorobenzene, dichloromethane, carbon tetrachloride and benzyl chloride.

7. The method of claim 1, further comprising, after the repressurization step, feeding the VOC to the adsorbent material of the second bed when the adsorbent material in the second bed is rendered suitable for adsorption of the VOC through the repressurzation step and, while the VOC is adsorbed by the adsorbent material in the second bed, simultaneously extracting the VOC adsorbed by the adsorbent material of the first bed by executing another desorption step by sequentially disconnecting the first bed from the second bed and reducing pressure of the first bed to cause desorption of the VOC in the adsorbent material of the first bed, executing another reflux step by transferring gas from the second bed to the first bed while removing the transferred gas from the first bed, and executing another repressurization step by increasing pressure of the first bed to a pressure suitable for adsorption of the VOC by the adsorbent material in the first bed using gas from the second bed.

8. The method of claim 7, wherein a feed gas containing the VOC is fed from a supply section to the first bed while VOC is simultaneously extracted from the adsorbent material in the second bed, and the feed gas is fed to the second bed, while VOC is extracted from the adsorbent material in the first bed.

9. The method of claim 8, further comprising operating a vacuum pump to reduce pressure of the second bed during the desorption step, and to reduce pressure of the first bed during the another desorption step.

10. The method of claim 9, wherein the feed gas includes a carrier gas and the VOC, and further comprising directing the carrier gas to a tank after each extracting step.

11. The method of claim 7, wherein the pressure of the second bed is reduced to a pressure in the range 2-20 kPa during the desorption step, and the pressure of the first bed is reduced to a pressure in the range 2-20 kPa during the another desorption step.

12. The method of claim 8, wherein the feed gas includes a carrier gas, and 10-20% of the carrier gas in the first bed is the gas transmitted to the second bed during the reflux step, and 10-20% of the carrier gas is the gas transmitted from the second bed to the first bed during the another reflux step.

13. The method of claim 7, wherein the pressure drop of the first bed or the pressure drop of the second bed is in the range 1-3 kPa while the VOC is being adsorbed.

14. The method of claim 7, wherein the adsorbent material of the first bed and the second bed is selected from a group consisting of a zeolite, a molecular-sieve carbon, activated carbon, silica gel, and activated alumina.

15. The method of claim 7, further comprising recovering the VOC extracted from the first bed or the second bed with a condenser.

16. The method of claim 7, further comprising terminating the feeding the VOC and switching to the extracting the VOC at no more than 80% of maximum saturation of the adsorbent material that is adsorbing the VOC.

17. The method of claim 7, wherein the first bed and the second bed are selectively connectable to permit gas transfer from the first bed to the second bed, and gas transfer from the second bed to the first bed, and selectively disconnectable to prevent gas transfer from the first bed to the second bed or from the second bed to the first bed, and wherein the reflux step is executed by connecting the first bed to the second bed and transferring gas from the first bed to the second bed and removing the transferred gas from the second bed, and the another reflux step is executed by connecting the second bed to the first bed and transferring gas from the second bed to the first bed and removing the transferred gas from the first bed.

18. The method of claim 7, wherein the repressurization step is executed by connecting the first bed to the second bed and transferring gas from the first bed to the second bed, and the another repressurization step is executed by connecting the second bed to the first bed and transferring gas from the second bed to the first bed.

\* \* \* \* \*